United States Patent [19]

Hogan et al.

[11] 3,987,284

[45] Oct. 19, 1976

[54] CONIC GENERATOR FOR ON-THE-FLY DIGITAL TELEVISION DISPLAY

[75] Inventors: Walter John Hogan, Fairfax, Va.; Alfred Alexander Schwartz, Gaithersburg, Md.

[73] Assignee: International Business Machines Corporation, Armonk, N.Y.

[22] Filed: Dec. 3, 1974

[21] Appl. No.: 529,192

[52] U.S. Cl. .......................... 235/152; 340/324 AD

[51] Int. Cl.[2] ............................................ G06F 3/14

[58] Field of Search .............. 235/152; 340/324 AD, 340/172.5

[56] References Cited

UNITED STATES PATENTS

| | | | |
|---|---|---|---|
| 3,761,765 | 9/1973 | Machin et al. | 340/324 AD X |
| 3,763,363 | 10/1973 | Saita et al. | 235/152 |
| 3,781,850 | 12/1973 | Gicca et al. | 340/324 AD |
| 3,792,464 | 2/1974 | Hamada et al. | 340/324 AD |
| 3,821,731 | 6/1974 | Levine | 340/172.5 X |
| 3,848,232 | 11/1974 | Leibler | 340/172.5 |

*Primary Examiner*—David H. Malzahn
*Attorney, Agent, or Firm*—John E. Hoel

[57] ABSTRACT

Apparatus is disclosed to implement a recursive technique to generate the coordinates of horizontal raster line components which intersect a conic-section shape to be represented. The apparatus cooperates with a refresh buffer which stores the video data in coded form to be read out ordered by raster line location and an intermediate buffer which permits these coded data to be read as many times as is needed during the course of displaying one frame of pictorial information, and then to be dropped, and a partial raster assembly storage which permits data to be written randomly along a given raster line.

28 Claims, 11 Drawing Figures

IB TO CONIC GENERATOR WORD FORMAT

CONIC GENERATOR

TIMING CHART FOR WORST CASE CONIC

SQUARE ROOT GENERATOR

EXAMPLE OF CONIC GENERATION

CONIC GENERATOR

CONIC GENERATOR FOR ON-THE-FLY DIGITAL TELEVISION DISPLAY

FIELD OF THE INVENTION

The invention disclosed herein relates to digital television display systems and more particularly to apparatus for generating conic shapes in a coded, on-the-fly digital television display.

BACKGROUND OF THE INVENTION

The conic generator invention disclosed herein is employed as a subsystem in the video generator circuit for a dynamic digital television display disclosed in U.S. Pat. application 478816, A. A. Schwartz, and W. J. Hogan, filed 6/11/74 and assigned to the instant assignee. This video generator circuit system converts randomly occurring data signals representing graphical patterns into a time sequential video signal for use with a sequentially line scanned display device. The circuit is comprised of a threaded buffer connected to receive the data signals and adapted to sort the data signals into groups ordered by extremal scan line positions for the pattern represented. An intermediate buffer has a first input connected to the output of the threaded refresh buffer for storing the ordered data signals once during each display field before the display of the pattern represented and outputting the ordered data signals in synchronism with the line scans of the display. A graphical pattern generator is connected to the output of the intermediate buffer for decoding the ordered data signals outputted therefrom and generating on a first output line components of the pattern represented which lie along the display line to be scanned. A partial raster assembly storage is connected to the first output line from the graphical pattern generator, to store the components of the pattern represented which lie along the display line to be scanned. The graphical pattern generator modifies the decoded ordered data signals to identify the horizontal coordinate for the intersection of the pattern represented with the next display line to be scanned, and outputs the modified data signal over a second output line to a second input line for storage in the intermediate buffer. The graphical pattern generator omits the output of a modified data signal on the second output line when no components of the pattern will intersect succeeding display lines to be scanned in the field.

Prior art digital conic generators have employed recursive techniques to incrementally generate a conic section to be displayed one element at a time. Although this may be suited to random plotters, this mode of generation is not suitable to raster-type devices since the generation time for the conic section is proportional to the number of elements which fall on a raster line. What the art requires is an improved conic shape generator which generates all of the elements on each raster line at a single time and would, therefore, be amenable to high speed television display.

OBJECTS OF THE INVENTION

It is an object of the invention to generate conic sections for display in an improved manner.

It is another object of the invention to generate conic sections for a raster display device in an improved manner.

It is still a further object of the invention to generate conic sections for display on a raster scan device where the elements to be displayed on each raster line are generated at the same time.

It is still a further object of the invention to generate conic sections for an on-the-fly, coded data digital television display in a faster manner than has been available in the prior art.

It is still a further object of the invention to generate a conic section on a digital television display, more accurately and faster than has been available in the prior art.

SUMMARY OF THE INVENTION

The ellipse to be displayed is characterized by a display axis having an inverse slope $\Delta X_p/\Delta Y$ which intersects the vertical extrema of the ellipse and an inverse rate of change of the slope of the ellipse of $\Delta^2 X_q^2/\Delta^2 Y$, where the raster lines have a vertical separation of $\Delta Y$. The data signals are input to the conic generator having values for the constants $\Delta X_p$ and $\Delta^2 X^2_q$ and values for $X^2_q$ $\Delta X^2_q$, and $X_p$ at the extremum of the ellipse, where $X_q$ is the horizontal distance from the display axis to the ellipse. The conic generator comprises a register means connected to the output of an intermediate buffer for receiving the values of $\Delta X_p$, $\Delta^2 X^2_q$, $X_p$, $X_q^2$, and $\Delta X_q^2$. A square root generating means has an input connected to the register means for calculating the square root of $X_q^2$. A first adder means having an addend input connected to the output of the square root generator and an augend input connected to the register means calculates the sum $X_p + X_q$ and the difference $X_p - X_q$ as the location along the display line to be scanned of the intersection with the ellipse. A video signal generating means has an input connected to the first adder means and an output connected to the partial raster assembly storage, for generating a video signal at the locations along the display line to be scanned corresponding to the values of $X_p + X_q$ and $X_p - X_q$. A second adding means having an augend and an addend input connected to the register means adds $\Delta X_p$ to $X_p$ to get a new value of $X_p$, $\Delta X_q^2$ to get a new value of $X_q^2$, and $\Delta^2 X_q^2$ to $\Delta X^2_q$ to get a new value of $\Delta X_q^2$. An intermediate buffer output gate has an input connected to the second adding means and a feedback output connected to the input of the intermediate buffer for rewriting the data word into the intermediate buffer with new values for $X_p$, $X_q^2$ and $\Delta X_q^2$. The ellipse is displayed as a sequence of vector segments through the iterative operation of the conic generator.

DESCRIPTION OF THE DRAWINGS

The foregoing and other objects, features, and advantages of the invention will be apparent from the following more particular description of the preferred embodiment of the invention, as illustrated in the accompanying drawings.

DISCUSSION OF THE PREFERRED EMBODIMENT

Video Generator System Context for the Conic Generator Invention

Figure 1:
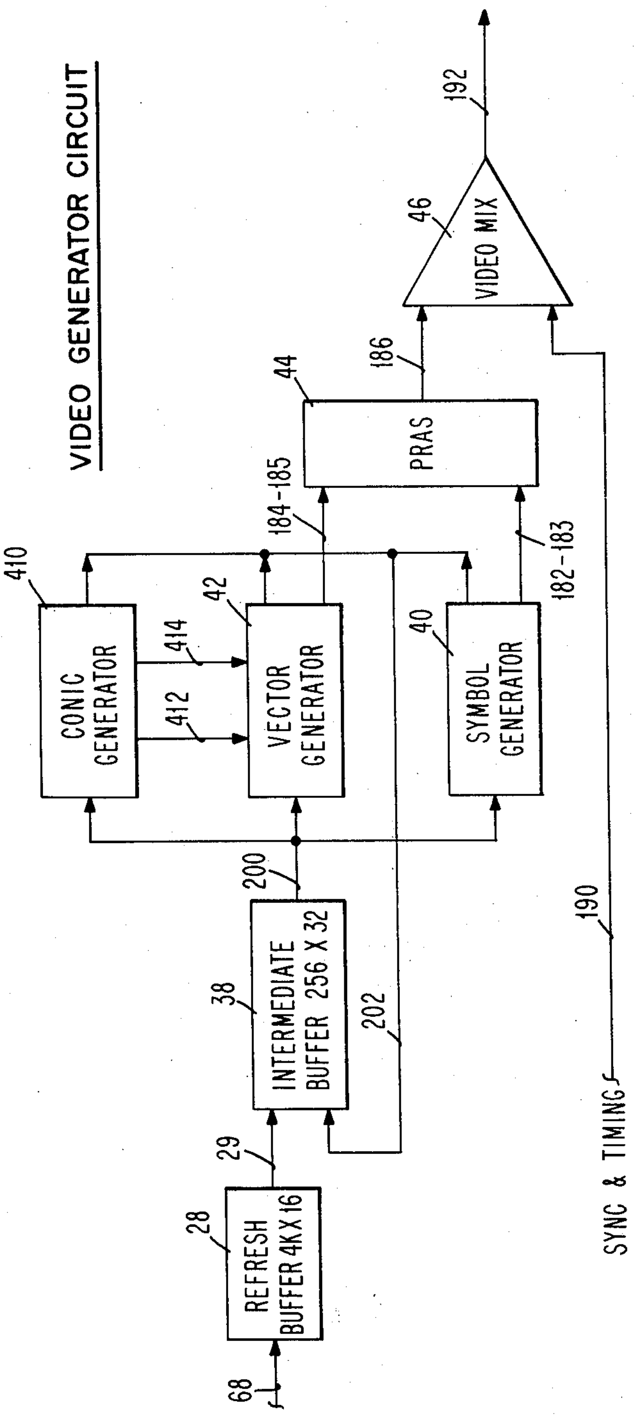
FIG. 1 illustrates the video generator circuit within which the conic generator invention finds application.

FIG. 1 illustrates the context within which the conic generator invention 410 finds application, namely the video generator circuit disclosed in U.S. Pat. application No. 478,816, for a dynamic digital television display.

Dynamic digital TV display operation can be generally described as follows. Digital TV is a display technology which takes coded data from computer sources and converts it to a TV video signal. This signal drives one or more TV monitors which present the desired computer display picture. The logic which converts the coded computer data to a TV signal is all digital, the same as that used in a computer. Thus, digital TV has succeeded in using the technical advances developed in both the TV and computer industries to provide a unique computer display capability.

A TV display in the context used here is one in which one or more electron beams are repeatedly deflected across the face of the Cathode Ray Tube (CRT) in a series of closely spaced parallel lines (called a raster). This is repeated a fixed number of times each second (refresh rate). Within a particular display system the number of parallel lines and the refresh rate are usually fixed. A typical display has 525 lines and is refreshed 30 times per second. Each frame is divided into two fields. One field consists of the odd number scan lines and the other the even scan lines; this results in an interlaced scan which produces an apparent doubling of the refresh rate.

Digital TV presents a computer display in a TV format by reducing the image to a matrix of points or display elements. In a display with horizontal scan lines, the number of vertical display elements is equal to the number of visible scan lines. The number of elements within each scan line is somewhat arbitrary but is typically 1.33 times the number of scan lines. Even though the image is made up of elements, it appears continuous because of the large number of elements used.

The video generator circuit disclosed in U.S. Pat. application No. 478,816 makes use of the new technique of graphic generation known as "on-the-fly" or "implicit refresh" not found in older DTV systems. The on-the-fly technique permits all displayable data to retain its identity in computer coded form up to the final stages of video generation.

In use, implicit refresh allows for erasing data on the display without erasing overlaying (intersecting) data. It permits selective modification of the data. This method of display generation is particularly attractive when blink (flash) and color are desired. The attribute bits for identification of color and flash are contained in computer coded form. In terms of hardware, implicit refresh can reduce the storage requirements in memory by a factor of 18 to 1 for a color graphic display.

The video generator circuit invention shown in FIG. 1, makes use of the "on-the-fly" refresh technique to dynamically generate a digital television display. The video generator circuit is composed of the refresh buffer 28, the intermediate buffer 38, the vector generator 42, an optional symbol generator 40, and the partial raster assembly store 44. The conic generator 410, to which the instant disclosure is directed, is shown connected to the intermediate buffer 38 and the vector generator 42.

Figure 3:
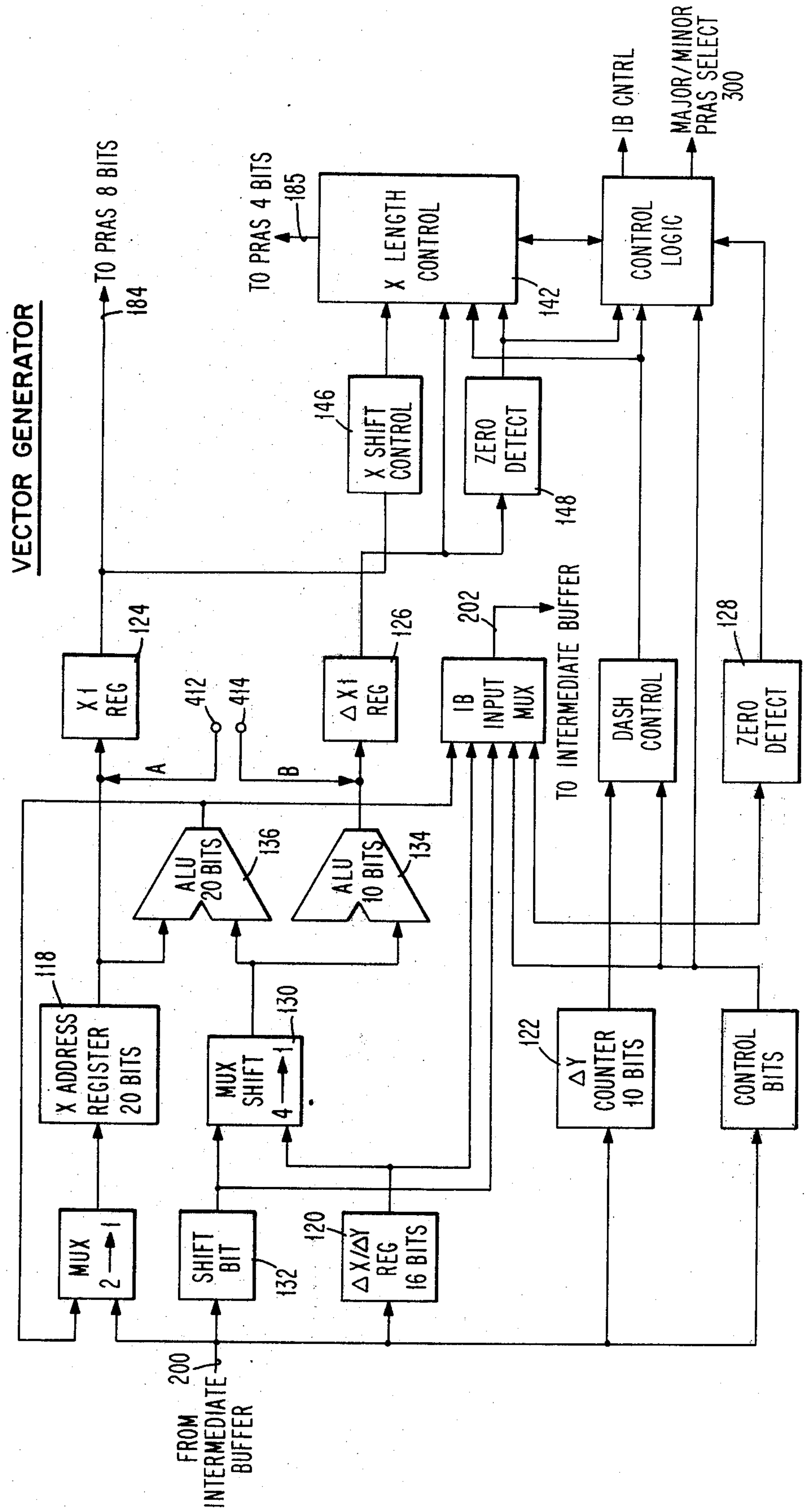
FIG. 3 shows in detail the vector generator for the video generator circuit of FIG. 1.

The refresh buffer 28 accepts data signals representing picture elements from a data source such as a computer or programmable controller. The refresh buffer 28 reads the data words out, ordered by Y-address, once per field for the vectors, symbol and conic shapes to be displayed, organized as background and dynamic data. The refresh buffer 28 consists of a control module and a storage module providing a total of 8K halfwords, each with sixteen data and two parity bits. The major function of the refresh buffer 28 is to store the coded data for constructing the visual display. Data, which is received from the digital computer over line 68 in random fashion, is stored in a form ordered by Y-line. This allows the refresh buffer 28 to be read on a line-by-line basis. A detailed block diagram of the refresh buffer is shown in FIG. 3 of U.S. Pat. application Ser. No. 478,816.

Figure 2:
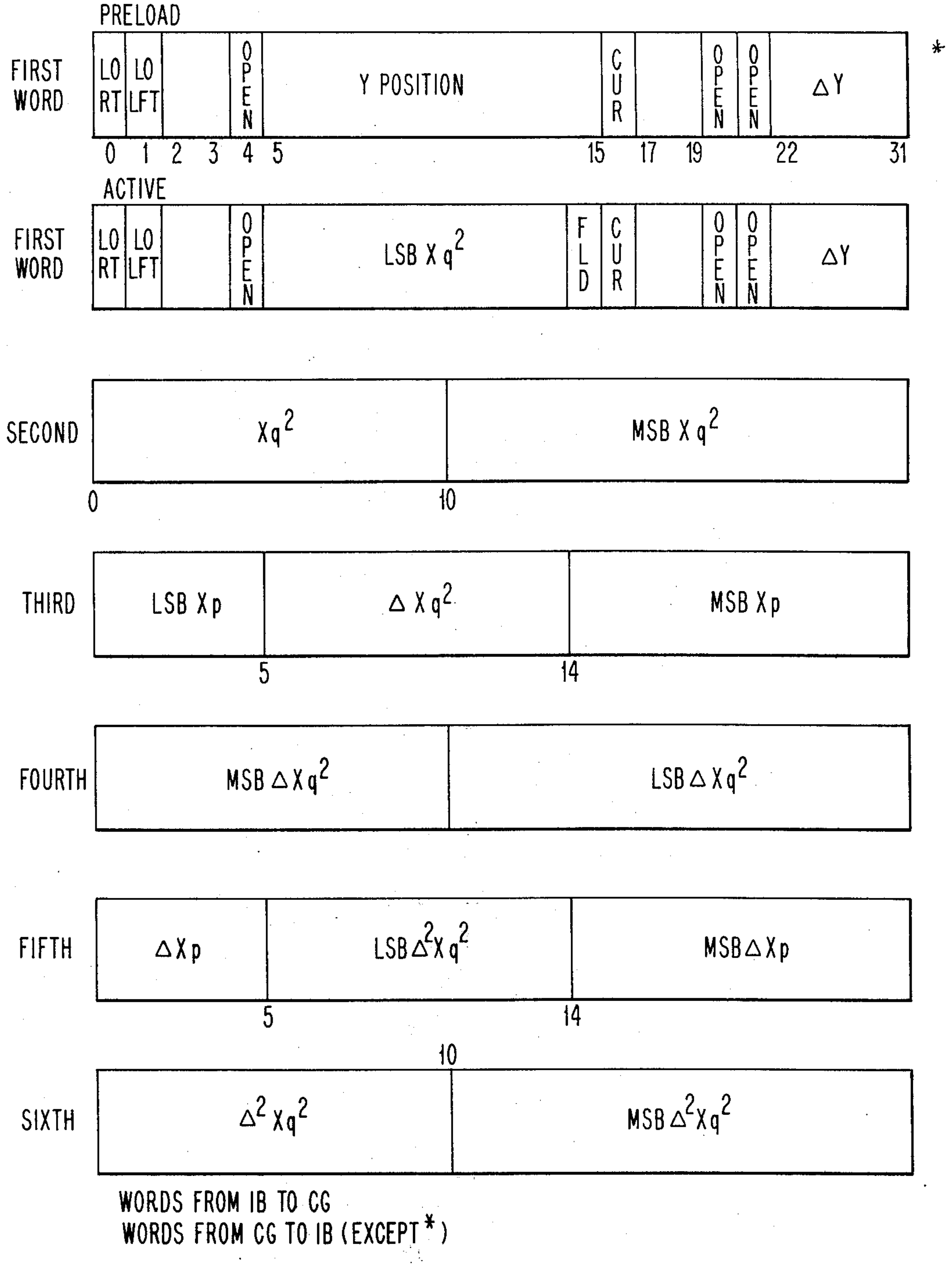
FIG. 2 depicts the data word format for a conic section, which is input to the conic generator.

The data word input from a data processor to the refresh buffer 28 for conic sections require six 32 bit words each, with four additional redundant words to facilitate threading of the data by Y value. Words 3, 4, 5 and 6 of FIG. 2 are paired, each with an additional word 1 containing the value $Y_i$ to facilitate identification of threaded queues in the refresh buffer. Data words are transferred from the digital computer to the refresh buffer 28 on a shared bi-directional halfword bus 68.

Figure 4:
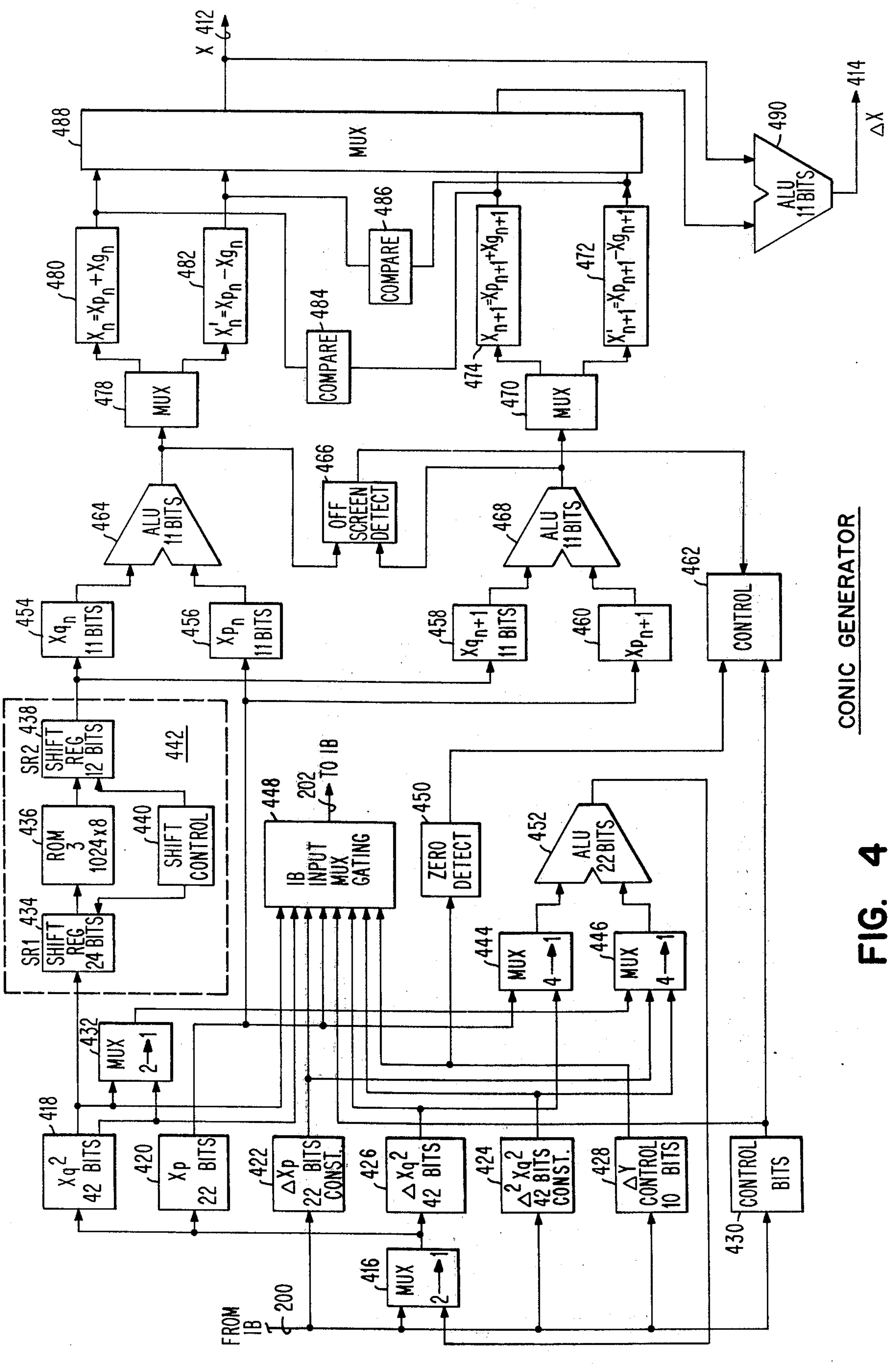
FIG. 4 depicts in detail the conic generator invention which finds application in the video generator circuit of FIG. 1.

The intermediate buffer 38 is a small, high-speed, memory, which receives data in coded form from the refresh buffer 28, and transmits the data, in turn to the conic generator 410, symbol generator 40, or vector generator 42, as required. The intermediate buffer 38 receives, from the refresh buffer 28 six 32-bit words for each conic section starting on a raster line. This data is required by the IB 38, as memory space becomes available, prior to the time the raster line is transmitted to the video mixer 46. A detailed block diagram of the intermediate buffer is shown in FIG. 4 of U.S. Pat. application Ser. No. 478,816.

The six coded data words shown in FIG. 2 are transmitted, at high speed, to the conic generator where, in cooperation with the vector generator 42, they are converted into digital video data. Since a conic section may appear on several raster lines, the conic section generator 410 modifies the coded data words, and then rewrites them into the intermediate buffer 38, for use in generating the digital video data for the next raster line. If the video data conversion has been completed during the generation of the current raster line, that particular set of data words is not rewritten into the intermediate buffer 38.

The intermediate buffer 38 is organized into a preload area and an active area, with a total capacity of 256 32-bit words. Data words are transferred from the refresh buffer 28 to the preload area as room becomes available, and from the preload area to the active area as required for display.

The vector generator 42 accepts two data words from the intermediate buffer 38 and uses them to determine which elements on each display line comprise the vector. All vectors are specified by the host processor as individual vectors starting at the top and running downward on the screen. The vector generator's video dot pattern generating circuitry is used by the conic generator 410, to generate video dot patterns for conic sections to be displayed. A detailed block diagram of the vector generator is shown in FIG. 3.

Figure 5:
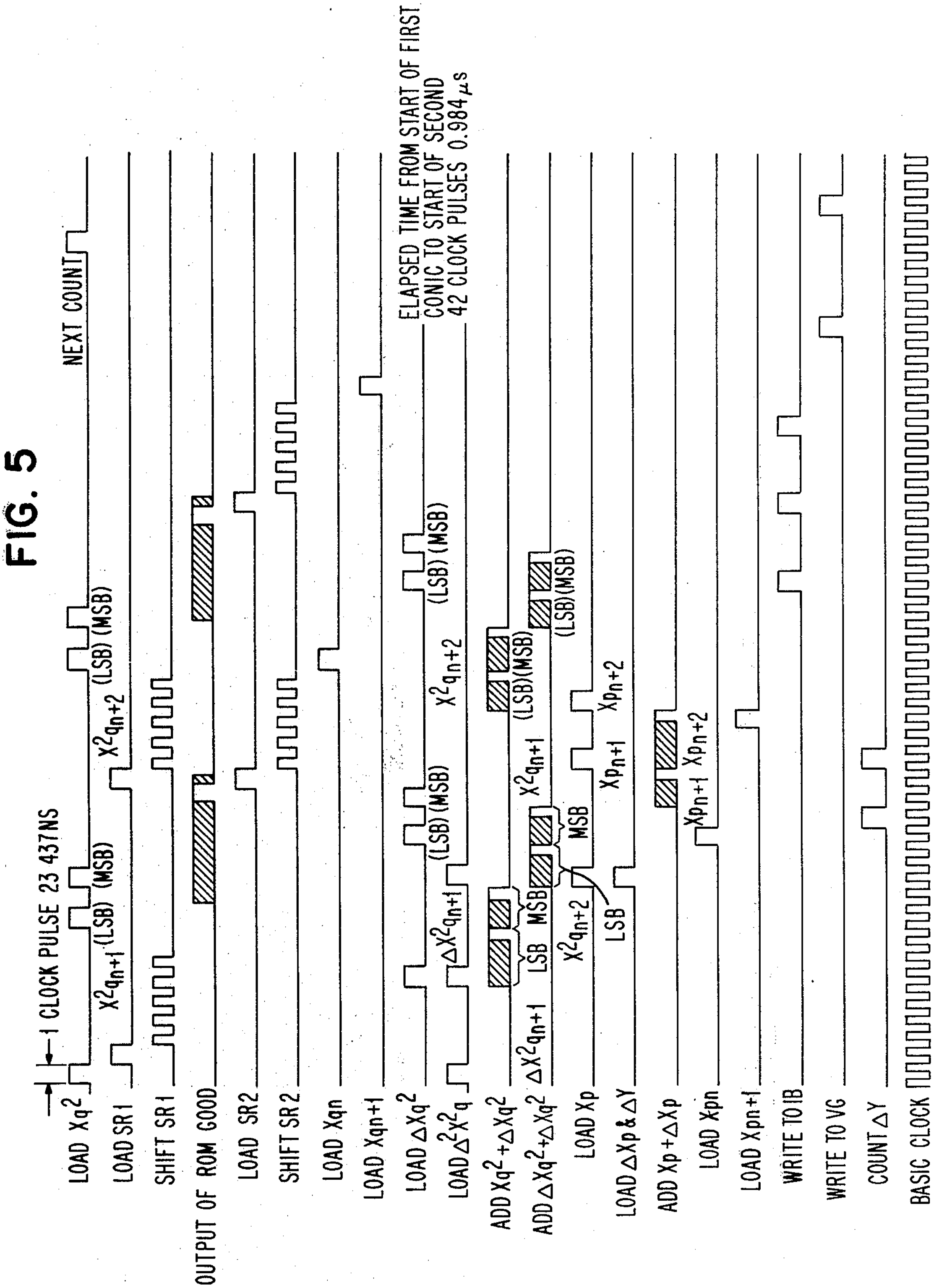
FIG. 5 illustrates a timing chart for the operation of the conic generator of FIG. 4.
Figure 6:
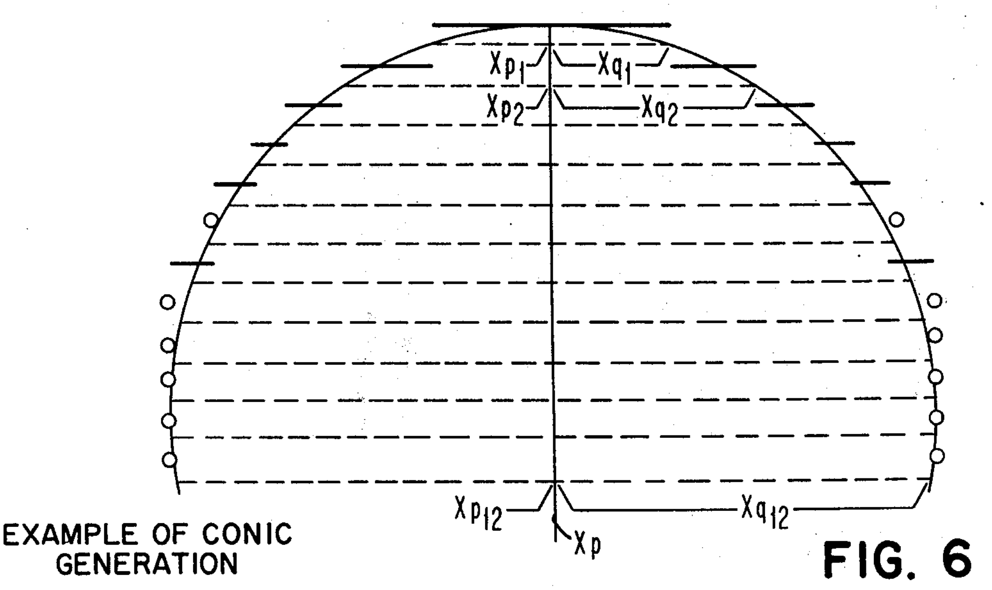
FIG. 6 illustrates a circle simulated with raster segments generated by the conic generator of FIG. 4.

The conic generator invention 410 is shown in FIG. 4. It has an input line 200 from the intermediate buffer 38, a feed back output line 202 to the intermediate buffer 38, and two output lines 412 and 414 to the vector generator 42. A timing diagram for the conic generator is shown in FIG. 5. The conic generator uses coded data in the format shown in FIG. 2 to calculate the starting X coordinate and the ΔX length for each of two raster line segments which represent the intersection of the conic section with that raster line. A circle simulated by raster segments is shown in FIG. 6. These X and ΔX values are output over lines 412 and 414 respectively to the vector generator 42, for generation of the video dot pattern. The conic generator 410, then modifies the contents of the coded data whose format is shown in FIG. 2, to represent the intersection of the conic section with the next raster line to be displayed and outputs this modified data over feed back line 202 to the intermediate buffer 38.

Figure 7:
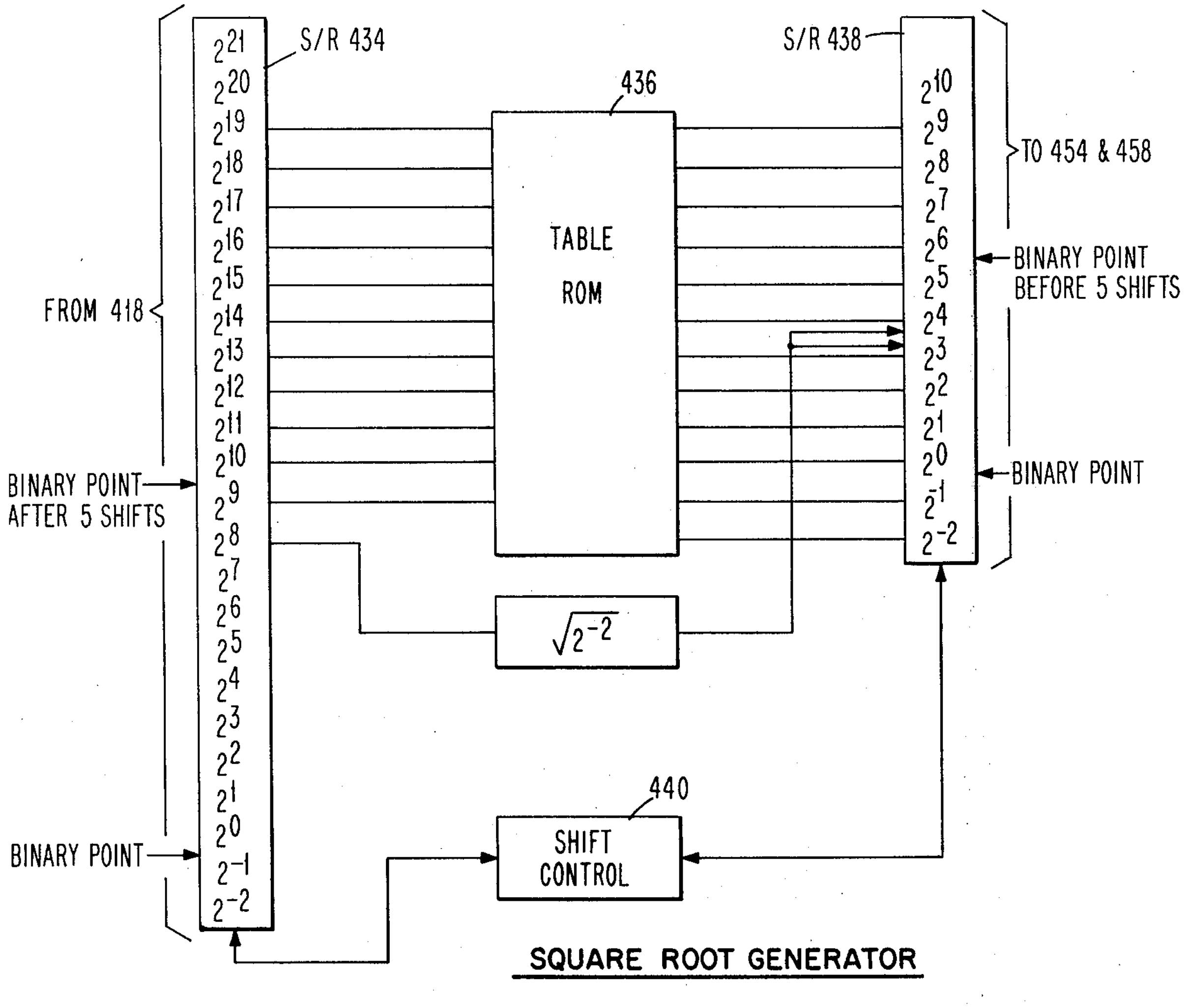
FIG. 7 is a block diagram of the square root generator used in the conic generator of FIG. 4.

The partial raster assembly store 44 (PRAS) is a high-speed memory with capacity for two full display raster lines in explicit (noncoded video dot pattern) form. All conic section, vector, and symbol dot pattern data are assembled in one line of the PRAS 44 during the line time preceding its normal display presentation. When the video line is to be displayed, the PRAS line is read out at video rate while the next line is being assembled in the second PRAS line. A detailed block diagram of the PRAS is shown in FIG. 7 of U.S. Pat. application Ser. No. 478,816.

The digital video output signal from the PRAS 44 is routed to a video output driver 46, where it is mixed for sync signals, and converted to a composite video signal for transmission over line 192 to the DTV display. One output driver 46 is required for each primary color.

CONIC GENERATOR

Figure 8A:
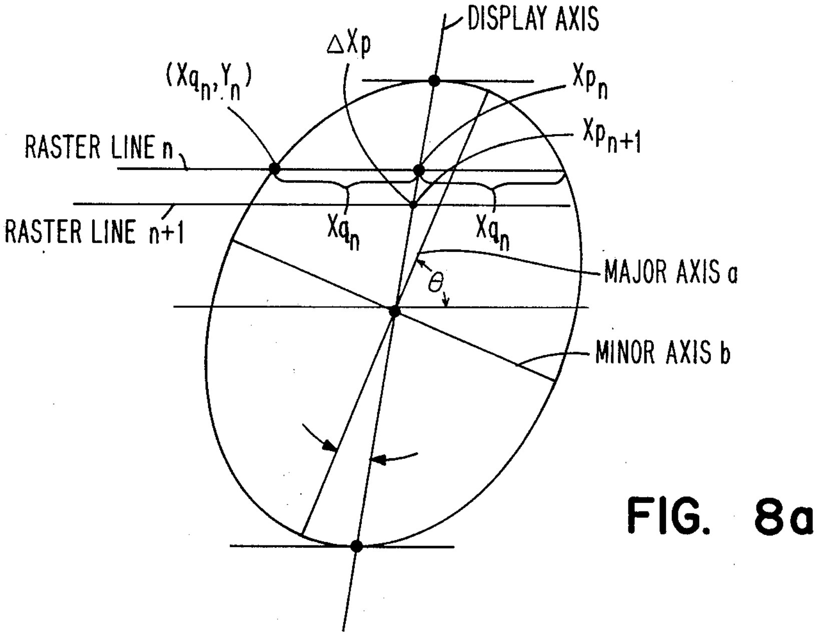
FIG. 8A shows the relationship of the axes for the ellipse to be displayed.

The host processor uses an iterative loop to calculate a straight line (Xp) and a displacement from that straight line (Xq). The conic intersections are then Xp ± Xq, as shown in FIG. 8*a*. The equations are:

$$Xp_{n+1} = Xp_n + \Delta Xp$$

$$Xq^2_{n+1} = Xq^2_n + \Delta Xq^2_n$$

$$\Delta Xq^2_n = \Delta Xq^2_{n-1} + \Delta^2 Xq^2$$

where ΔXp and $\Delta^2Xq^2$ are constants.

The host processor calculates the initial values of Xp, ΔXp, $Xq^2$, $\Delta X^2q$, and $\Delta^2Xq^2$ as follows.

The equation of an ellipse is $Ax^2 + Bxy + Cy^2 - 1 = 0$ where $$A = \frac{a^2 \sin^2\theta + b^2 \cos^2\theta}{a^2b^2}$$

-continued $$B = \frac{2 \sin\theta \cos\theta\,(a^2 - b^2)}{a^2b^2}$$

$$C = \frac{a^2 \cos^2\theta + b^2 \sin^2\theta}{a^2b^2}$$

where $$a = \frac{\text{major axis}}{2}$$

$$b = \frac{\text{minor axis}}{2}$$

$\theta$ = angle of rotation

Next $Y_T$ is found which is the *y* value for the topmost point on the ellipse measured from the center of the ellipse.

$$Y_T = \sqrt{\frac{-4A}{B^2 - 4AC}}$$

Using $Y_T$ the initial values can be found $$Xp_i = -\frac{B}{2A}([Y_T] - 1/2) + X_c$$

$$\Delta Xp = -\frac{B}{2A}$$

$$X^2q_i = \frac{B^2 - 4AC}{4A^2}([Y_T] - 1/2)^2 + \frac{1}{A}$$

$$\Delta^2Xq^2 = 2\,\frac{B^2 - 4AC}{4A^2}$$

$$\Delta Xq_i^2 = -([Y_T] - 1)\Delta^2Xq^2$$

$$\Delta Y = 2[Y_T]$$

These values are then written to the *y* line address corresponding to $[Y_T] + Y_c$, where $[Y_T]$ is the integer portion of $Y_T$, and $X_c$ and $Y_c$ are the address of the center of the conic.

Figure 8B:
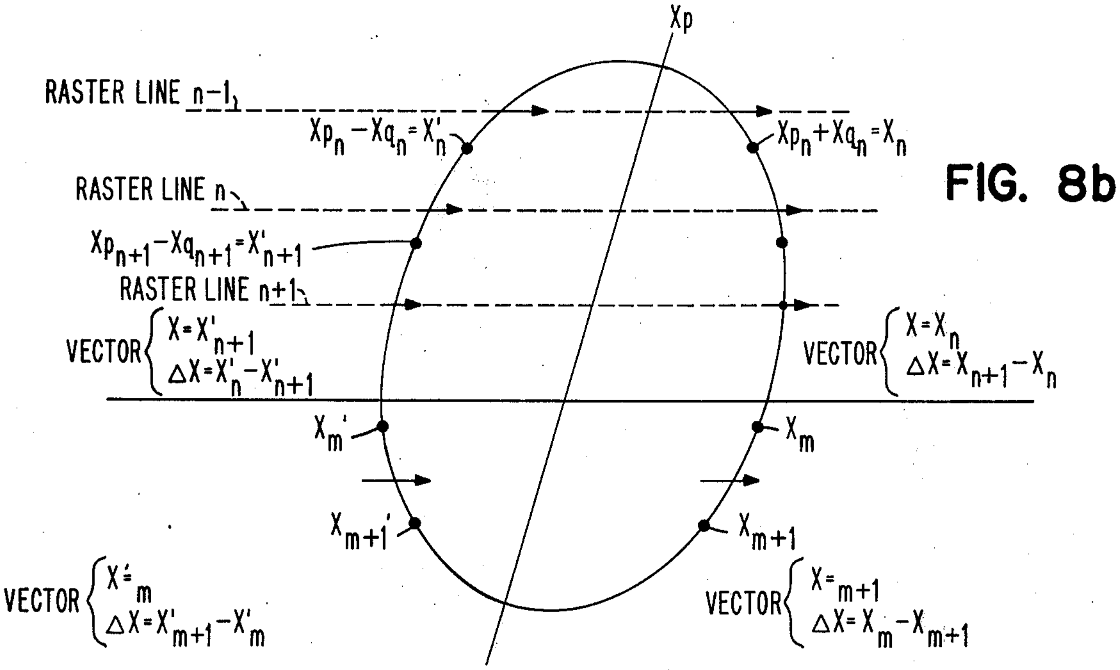
FIG. 8B illustrates the vector segments generated for the ellipse of FIG. 8A.

Using ($[Y_T]$ — ½) in the calculations causes the iterative formulae to calculate the conic intersections at the mid-point between adjacent TV lines (see FIG. 8*b*). The display is then generated by drawing a horizontal line segment from the intercept ½ line above each TV line to the intercept ½ line below that line on the TV line. ΔY is the height in TV lines of the conic.

IMPLEMENTATION

A block diagram of the implementation is shown in FIG. 4 with a timing chart shown in FIG. 5.

The conic data is contained in six words of the Intermediate Buffer shown in FIG. 2. These words contain:

$Xq^2$, $\Delta^2Xq^2$, $\Delta Xq^2$,

Xp, ΔXp, ΔY

When the first two words are read $Xq^2$ is loaded into the $Xq^2$ register 418 and the 24 most significant bits are transferred into SR1 434, (ΔY is are also loaded into ΔY428). Sr1 is a 2-bit-at-a-time shift register which shifts the data up until either a 1 appears in one of the two most significant bit positions or for a maximum of five shift pulses. The number of shift pulses is stored in the shift control logic 440 and the 11 MSBs of SR1 434 are used as inputs to the square root ROM 436.

For the analysis of this method for obtaining a square root, see below. The implementation provides shifting until either the first 1s of $Xq^2$ are in the most significant addresses of the ROM 436 or all of the whole number portion (five 2-bit shifts) of $Xq^2$ is at the addresses of the ROM 436. When the outputs of the ROM 436 have stabilized, the number is loaded into SR2 438. SR2 438 is a 1-bit-at-a-time shift register and the contents are shifted down the same number of times they were shifted up in SR1 434. This method is a way to use floating point to obtain the square root. For example shifting SR1 434 up five times by 2 bits each time is equivalent to multiplying by $2^{+10}$, shifting SR2 438 down five times by 1 bit each time is equivalent to multiplying by $2^{-5}$; thus after 5 shifts:

$$SR1 = Xq^2 \times 2^{10}$$

$$\text{and output of } ROM = \sqrt{Xq^2 \times 10^{+10}} = Xq \times 2^5$$

after 5 shifts $SR2 = Xq \times 2^5 \times 2^{-5} = Xq$

This value is then loaded into $Xq_n$ 454.

At the same time, words 3 and 4 are read from the Intermediate Buffer and $\Delta Xq^2$ and the $\Delta Xp$ are loaded into these respective registers. $Xq^2$, $\Delta Xq^2$ and $\Delta^2 Xq^2$, are all accurate to 42 bits as required per the error analysis below. These are added in two steps through a 22 bit adder 452. The 22 least significant bits are added and the carry saved, then the 20 most significant bits are added with the carry added in. In this manner $Xq^2_{n+1}$ is generated by adding $Xq^2_n + \Delta Xq^2_n$ and $\Delta Xq^2_{n+1}$ is generated by adding $\Delta Xq^2_n + \Delta^2 X^2 q$. $Xq^2_{n+1}$ is loaded into the $Xq^2$ register 418 and, when the output of the ROM 436 is loaded into SR2 438, $Xq^2$ is loaded into SR1 434 and the square root process repeated to find $Xq_{n+1}$.

When words 5 and 6 are read from the Intermediate Buffer $\Delta Xp$ and the $\Delta^2 Xq^2$ are loaded into the appropriate registers. The 11 most significant bits of Xp are transferred to the $Xp_n$ register 456 and, after $\Delta Xq^2_{n+1}$ has been calculated, $Xp_{n+1}$ is calculated and loaded into Xp 456 and $Xp_{n+1}$ 460 registers. Next, $Xp_{n+2}$ is calculated and loaded into Xp 420 ready to be rewritten into the I.B. 38. Then, values of $Xq^2_{n+2}$ and $\Delta Xq^2_{n+2}$ are calculated and loaded into $Xq^2$ 418 and $\Delta Xq^2$ 426, respectively, and these values written back into the Intermediate Buffer 38.

When the value of $Xq_{n+1}$ has been determined, it is loaded into $Xq_{n+1}$ register 458 and values of $$X_n = Xp_n + Xq_n$$

$$X'_n = Xp_n - Xq_n$$

$$X_{n+1} = Xp_{n+1} + Xq_{n+1}$$

$$X'_{n+1} = Xp_{n+1} - Xq_{n+1}$$

are generated from the 11 bit ALUs. These values are transferred into the registers 480, 482, 474, and 472, respectively. Comparitors 484 and 486 control MUX 488 to output the smaller value of $X_n$ and $X'_n$ and of $X_{n+1}$ and $X'_{n+1}$ as the value $x$ on line 412 and the difference as the value $\Delta x$ on line 414, to the vector generator 42. An off-screen detect circuit is provided to determine when the line segments are off the screen in which case no write to the vector generator is performed. For conics which begin above the top of the visible raster, values of $Xp_i$, $Xq^2_i$ and $\Delta X^2 q_i$ are calculated by the host processor using the iterative equation.

The value of $\Delta Y$ is decremented twice each time it is read and compared to zero. When zero is detected, the conic is completed, thus is not written back into the Intermediate Buffer 38. To ensure closure of the conic, $Xq_{n+1}$ is forced to zero, so that the two vector elements are drawn to $Xp_{n+1}$, insuring a solid vector at the bottom of the conic.

Special consideration is also made at the top of the conic where $Xp_n$ and $Xp_{n+1}$ are both loaded with $Xp_i$ (Xp initial) and $Xq_n$ and $Xq_{n+1}$ are both loaded with $Xq_i$ (Xq initial), thus drawing a solid vector at the top of the conic.

MATHEMATICAL ANALYSIS

Derivation

The iterative equations for generating conics were derived as follows: Equation of an ellipse:

$$\frac{X^2}{a^2} + \frac{Y^2}{b^2} = 1 \tag{1}$$

where $a$ and $b$ are the semi-axis, $$b^2x^2 + a^2y^2 = a^2b^2 \tag{2}$$

Figure 8C:
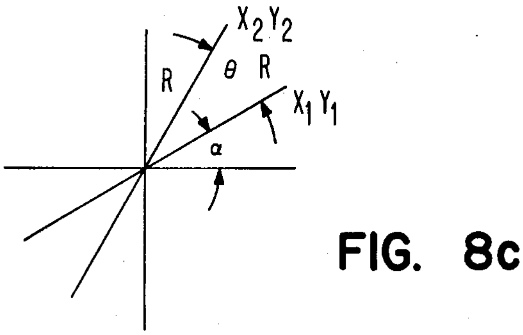
FIG. 8C illustrates the relationship of the coordinates of an ellipse after rotation through an angle $\theta$.

Rotating axis through angle $\theta$ as shown in FIG. 8*c*.

$$R = \sqrt{X_1^2 + Y_1^2}$$

$$X_1 = R \cos \alpha$$

$$Y_1 = R \sin \alpha$$

$$X_2 = R \cos (\alpha + \theta)$$

$$Y_2 = R \sin (\alpha + \theta)$$

$$X_2 = R (\cos \alpha \cos \theta - \sin \alpha \sin \theta)$$

$$\cos \alpha = \frac{X_1}{R}$$

$$\sin \alpha = \frac{Y_1}{R}$$

$$X_2 = R \left( \frac{X_1}{R} \cos \theta - \frac{Y_1}{R} \sin \theta \right)$$

and $$X_2 = X_1 \cos \theta - Y_1 \sin \theta \tag{3}$$

$$Y_2 = R (\sin \alpha \cos \theta + \cos \alpha \sin \theta)$$

$$R = \left( \frac{Y_1}{R} \cos \theta + \frac{X_1}{R} \right) \sin \theta$$

and $$Y_2 = Y_1 \cos \theta + X_1 \sin \theta \tag{4}$$

by substitution into (2)

$$b^2(X_1\cos\theta - Y_1\sin\theta)^2 + a^2(Y_1\cos\theta + X_1\sin\theta)^2 = a^2b^2.$$

or, more generally:

$$\frac{a^2\sin^2\theta + b^2\cos^2\theta}{a^2b^2} X^2 + \frac{2(a^2 - b^2)\sin\theta \cos\theta}{a^2b^2} XY + \frac{a^2\cos^2\theta + b^2\sin^2\theta}{a^2b^2} Y^2 - 1 = 0$$

Setting $$\frac{a^2\sin^2\theta + b^2\cos^2\theta}{a^2b^2} = A$$

$$\frac{2(a^2 - b^2)\sin\theta\cos\theta}{a^2b^2} = B$$

$$\frac{a^2\cos^2\theta + b^2\sin^2\theta}{a^2b^2} = C$$

we get $$AX^2 + BXY + CY^2 - 1 = 0. \quad (5)$$

Solving for $X$:

$$X = \frac{-BY \pm \sqrt{(BY)^2 - 4A(CY^2 - 1)}}{2A}$$

$$= -\frac{B}{2A}Y \pm \sqrt{\left(\frac{B^2 - 4AC}{4A^2}\right)Y^2 + \frac{1}{A}}$$

$$= Xp \pm Xq$$

where $$Xp = -\frac{B}{2A}Y = K_1Y$$

which is the equation of a straight line.. and $$Xq = \sqrt{\left(\frac{B^2 - 4AC}{4A^2}\right)Y^2 + \frac{1}{A}}$$

$$X_q^2 = K_2Y^2 + K_3 \quad (7)$$

$Y_T = Y$ at the top and bottom of the rotated ellipse occurs when $X = Xp$ (that is when $Xq = 0$).

$$K_2Y_T^2 + K_3 = 0$$

$$Y_T^2 = -\frac{K_3}{K_2}$$

$$= \frac{-4A}{B^2 - 4AC}$$

$$Y_T = \pm\sqrt{\frac{-4A}{B^2 - 4AC}}$$

and $$X_T = -\frac{B}{2A}Y_T$$

To develop a recursive formula for Xp:

$$Xp_n = K_1Y_n$$

$$Xp_{n+1} = K_1Y_{n+1}$$

However, if these are the values of Xp on two consecutive TV lines, $$Y_{n+1} = Y_n - 1$$

and $$\Delta Xp = Xp_{n+1} - Xp_n$$

$$\Delta Xp = (K_1Y_n - K_1) - K_1Y_n \quad (8)$$

$$\Delta Xp = -K_1.$$

and new values of Xp can be calculated by $$Xp_{n+1} = Xp_n + \Delta Xp. \quad (9)$$

Also, $$X^2q_n = K_2Y_n^2 + K_3$$

$$X^2q_{n+1} = K_2Y_{n+1}^2 + K_3$$

$\Delta X^2q = (K_2Y_{n+1}^2 + K_3) - (K_2Y_n^2 + K_3)$ and, since:

$$Y_{n+1} = Y_n - 1$$

$$\Delta X^2q = -2K_2Y_n + K_2 = K_2(1 - 2Y_n)$$

and $$X^2q_n = X^2q_{n-1} + \Delta X^2q \quad (10)$$

now $$\Delta X^2q_n = K_2(1 - 2Y_n).$$

$$\Delta X^2q_{n+1} = K_2(1 - 2Y_{n+1})$$

$$\Delta^2X^2q = 2K_2$$

and $$\Delta X^2q_n = \Delta X^2q_{n-1} + \Delta^2X^2q. \quad (11)$$

The conic generator must be supplied with the initial values for $X^2q$, $\Delta X^2q$, $\Delta^2X^2q$, Xp, and $\Delta Xp$. From the above derivations $\Delta^2X^2q = 2K_2$ and $\Delta Xp = -K_1$, also $Xp_i$ (Xp initial) is $$Xp_i = X_T = -\frac{B}{2A}Y_T$$

However, these values are all derived relative to the center of the ellipse; therefore, the actual value of X ($X_{ACT}$) required is $$X_{ACT} = Xp_i + X_{CENTER}$$

where $X_{CENTER}$ is the X coordinate of the center point of the conic. The values of $X^2q$ and $\Delta X^2q$ can be found by solving the initial equations with $Y_n = Y_T$.

Thus $$X^2q_i = \left(\frac{B^2 - 4AC}{4A^2}\right)Y_T^2 + \frac{1}{A}$$

and $$\Delta X^2q_i = \left(\frac{B^2 - 4AC}{4A^2}\right)(1 - 2Y_T)$$

However, the value of $Y_T$ which was calculated is the theoretical value at the very top and bottom of the conic. The display generator must operate with the values of these quantities at the points which intersect the TV lines. In fact, for the algorithm to be accurate, these values should represent the intersect points halfway between TV line; thus $X^2q_i$ and $\Delta X^2q_i$ are calculated at a value of Y called $Y_T$ which is equal to the integer portion of $Y_T$ minus ½.

ROUND-OFF ERROR

To determine the accuracy required in the conic generator to result in a ±1 accuracy in the X position, the following analysis was performed. To be within ±1, the value of Xp + Xq must be within ±½ because of the digitization error of ±½. Therefore, Xp and Xq must be within ±¼.

$$Xp_n = Xp_{n-1} + \Delta Xp$$

which is equivalent to $$Xp_n = Xp_i + (n-1)\Delta Xp$$

where $Xp_i$ = Xp initial, and $n$ is equal to the number of iterations. The error in ΔXp will cause the maximum error in $Xp_n$ when $n$ is maximum, thus $$Xp_{n_{max}} \pm \text{Err } Xp_{n_{max}} = Xp_i \pm \text{Err } Xp_i + (n_{max} - 1)\Delta Xp \pm (n_{max} - 1) \text{ Err } \Delta Xp$$

and $$\text{Err } Xp_{n_{max}} = \pm \text{Err } Xp_i \pm (n_{max} - 1) \text{ Err } \Delta Xp$$

Since only the conic values which occur between the top and bottom of the visible area of the grid are calculated, $n_{max} = 2^{10}$ and $$\text{Err } Xp_{n_{max}} = \pm \text{Err } Xp_i \pm (2^{10} - 1) \text{ Err } \Delta Xp$$

setting the error equal to ¼

$$2^{-2} = \pm \text{Err } Xp_i \pm (2^{10} - (1) \text{ Err } \Delta Xp$$

$$\text{Err } \Delta Xp \simeq \pm \frac{2^{-2}}{2^{10}}$$

or ΔXp must be accurate to $\pm 2^{-12}$. This is accomplished by calculating ΔXp to $2^{-12}$ accuracy and rounding off to $2^{-11}$ for the values originally loaded into the conic generator.

The value of $Xp_i$ need not be to this accuracy. As the following analysis of Xq will show, the maximum error in Xq occurs when $n = ½\, n_{max}$; at this point the Err $Xp_n$ due to Err ΔXp is only ½ Err $Xp_{n_{max}}$ or $\pm 2^{-3}$. To maintain $Xp_n$ accurate to ± ¼ at this point then, $Xp_i$ need only be accurate to $\pm 2^{-3}$ which can be accomplished by calculating $Xp_i$ to $2^{-3}$ accuracy and round off to $2^{-2}$.

For Xq to be ± ¼, the value of $X^2q$ must be correct to ± ½ Xq + 1/16.

Values of $X^2q_n$ are derived as follows:

$$X^2q_1 = X^2q_i$$

$$X^2q_2 = X^2q_1 + \Delta X^2q_i = X^2q_i + \Delta X^2q_i$$

$$X^2q_3 = X^2q_2 + \Delta X^2q_2$$

where $$\Delta X^2q_2 = \Delta X^2q_i + \Delta^2X^2q$$

So $$X^2q_3 = X^2q_i + 2\,\Delta X^2q_i + \Delta^2X^2q$$

$$X^2q_4 = X^2q_3 + \Delta X^2q_3$$

where $$\Delta X^2q_3 = \Delta X^2q_2 + \Delta^2X^2q = \Delta X^2q_i + 2\Delta^2X^2q$$

So $$X^2q_4 = X^2q_i + 3\Delta X^2q_i + 3\Delta^2X^2q$$

and $$X^2q_5 = X^2q_i + 4\Delta X^2q_i + 6\Delta^2X^2q$$

In general $$X^2q_n = X^2q_i + (n-1)\Delta X^2q_i + \frac{(n-1)(n-2)}{2}\Delta^2X^2q$$

The error in $X^2q_n$ is:

$$\text{Err } X^2q_n = \pm \text{Err } X^2q_i \pm (n-1) \text{ Err } \Delta X^2q_i \pm \frac{(n-1)(n-2)}{2} Err\ \Delta^2X^2q$$

The error in $X^2q_i$ can be made small by specifying enough bits of $X^2q_i$. If this is done, $$ErrX^2q_n \quad \pm (n-1)Err\Delta X^2q_i \pm \frac{(n-1)(n-2)}{2} Err\Delta^2X^2q$$

Since the errors are due to round-off, they can be additive and the maximum error will occur when $n = n_{max}$, which, since the iterative process is only performed over the height of the visible area of the screen, is equal to $2^{10}$.

$$ErrX^2q_n = \pm (2^{10} - 1)Err\Delta X^2q_i \pm \frac{(2^{10}-1)(2^{10}-2)}{2} Err\Delta^2X^2q$$

$$\simeq \pm 2^{10}Err\Delta X^2q_i \pm 2^{19}Err\Delta^2X^2q$$

Since the maximum error in $X^2q_n$ occurs when $n$ is a maximum, this means that the greatest error occurs at the bottom of the conic. Because the value of $X^2q_n$ is a minimum at this point, it is desirable to have the maximum error occur at the mid-point of the conic, when $X^2q_n$ is maximum. This can be accomplished by introducing an initial error in $\Delta X^2q_i$ which will offset the error caused by $\Delta^2X^2q$ at the bottom of the ellipse.

$$(n-1)\ Err\ \Delta X^2q_i = \frac{(n-1)(n-2)}{2} Err\ \Delta^2X^2q$$

and $$Err\ \Delta X^2q_i = \frac{(n-2)}{2} Err\ \Delta^2X^2q$$

One method of accomplishing this is to calculate $\Delta^2X^2q$ to greater accuracy than is used, thus allowing us to know the value of Err $\Delta^2X^2q$. This then could be multiplied by (n−2)/2 and subtracted from $\Delta X^2q_i$. Another means of accomplishing this is to calculate the value of $\Delta X^2q_i$ by calculating $$\frac{2Y_T - 2}{2}\Delta^2X^2q$$

and using this as $\Delta X^2q_i$. This ensures that when $n = 2Y_T$ (i.e., the bottom of the ellipse) the values of $$\frac{(n-1)(n-2)}{2}\Delta^2X^2q$$

and $(n-1)\ \Delta X^2q_i$ will be equal. The maximum error will now occur half-way down the conic as follows:

$$Err\ X^2q_n = \pm \frac{n[2Y_T - 2]}{2} Err\ \Delta^2X^2q_i \pm \frac{(n-1)(n-2)}{2} Err\ \Delta^2X^2q_i$$

Differentiating and setting equal to zero yields $$0 = \frac{(2Y_T - 2)}{2} Err\ \Delta^2X^2q_i - \frac{(2n-3)}{2} Err\ \Delta^2X^2q_i$$

$$n = \frac{[2Y_T + 1]}{2}$$

If $Y_T$ is large, then $$n \simeq Y_T$$

To determine the error at this point, we solve the error equation with $n$ equal to $Y_T$ and $$Err\ \Delta X^2q_i = \frac{2Y_T - 2}{2} Err\ \Delta^2X^2q$$

$$Err\ X^2q_n = (Y_T - 1)\frac{(2Y_T - 2)}{2} Err\ \Delta^2X^2q - \frac{(Y_T - 1)(Y_T - 2)}{2} Err\ \Delta^2X^2q$$

$$= \frac{(Y_T - 1)(Y_T)\ Err\ \Delta^2X^2q}{2}$$

since $Y_{T_{max}}$ is $2^9$ $$Err\ X^2q_n \simeq 2^{17}\ Err\ \Delta^2X^2q$$

It should be noted here that $\Delta^2X^2q$ cannot be specified using round-off. If round-off were performed, the value of $\Delta^2X^2q$ could be greater than actual, which would cause $X^2q_n$ to go negative too soon and, depending on the implementation, truncate the conic too soon or cause a negative value which would require an imaginary square root.

IMPLEMENTATION

In the actual implementation, the values of $\Delta^2X^2q$ and $\Delta X^2q_i$ are specified to $2^{-20}$ places. $\Delta^2X^2q$ is actually calculated to $2^{-20}$. The value of $\Delta Xq_i^2$ is calculated to $2^{-20}$ so that its error will be small. The error then can be found to be $$Err\ X^2q_n = \pm Err\ X^2q_i \pm (n-1) Err\ \Delta X^2q_i \pm \frac{(n-1)(n+2)}{2} Err\ \Delta^2X^2q$$

which is $$Err\ X^2q_n = \pm 2^{-11} \pm (n-1)2^{-21} \pm \frac{[(n-1)(n-2)]2^{-20}}{2}$$

and the error at $n = Y_T = 2^9$ (max error) is $$Err\ X^2q_n = \pm 2^{-11} \pm (2^9 - 1)2^{-21} \pm \frac{[(2^9 - 1)(2^9 - 2)]2^{-20}}{2}$$

$$\simeq \pm 2^{-11} \pm 2^{-12} \pm \frac{2^{-2}}{2}$$

$$= \pm 2^{-3} \pm 2^{-11} \pm 2^{-12}$$

The error in Xq resulting from the error in $X^2q$ is a function of the value of Xq. Since the maximum value of Err $Xq_n^2$ is a constant, the error is $Xq_n$ will be maximum when $Xq_n$ is minimum at the point where Err $X^2q_n$ is maximum. The minimum value of the minor axis of a conic is 3 (since a conic with a minor axis of 2 can be generated as a vector), thus the minimum value of $Xq_n$ when $Y = Y_T$ is 1.5, and $X^2q_n = 2.25$. The Err $X^2q_n \simeq 2^{-3}$ and $$2.25 \pm 2^{-3} \simeq 1.5 \pm 1/16$$

which means that the error in Xq caused by the accumulated error in $X^2q$ is at worst ± 1/16 and in general is much less. The maximum error in the square root circuit (below) occurs when $Xq_n$ is large ($2^9$) at which point the error in $Xq_n$ caused by Err $X^2q_n$ is very small, allowing the allocated error (± ¼) in Xq to be assigned to the square root circuit.

SQUARE ROOT GENERATOR 442

The method of obtaining the square root is to use a table lookup ROM 436 in conjunction with a two-bit-at-a-time shift register 434. The 24 most significant bits of $Xq^2$ are loaded into the shift register 434 of FIG. 7. If either of the two most significant bits is a one, a right shift is executed; if not, a series of left shifts (two bits at a time) is made until either a one is detected in the $2^{18}$ or $2^{19}$ bit positions or until five shifts have been made. Note that after five shifts the integer portion of $Xq^2$ has been shifted into position to address the square root table 436. The square root is taken and loaded into the output shift register 438, which executes the same number of shifts in the opposite direction, one bit at a time.

The output of the square root generator 442 is a 12-bit number with $2^{-2}$ added to the actual value of the square root of the input. Thus, if $Xq'^2$ (where Xq' is the square root of the round-off value of $Xq^2$ which is in positions $2^9$ through $2^{19}$ of the input register 434) is the input to the shift register 434, the output will be $Xq' + 2^{-2}$ or Xq' + ¼. The ¼ is added to allow the square root generator 436 to operate without requiring round-off of $Xq^2$. The rationale is as follows:

For conics, the maximum error in $Xq'^2$ is $2^8 + 2^7 + 2^6 + 2^5 + \simeq 2^9$. This represents the greatest percentage error when $Xq'^2 = 2^{18}$ since any number less than $2^{18}$ would have resulted in a shift. Therefore, to make Xq within the required ± ¼, the output of the square root generator 436 must be ± ¼ for this worst case condition.

For this case, the actual value of $Xq^2$ lies between $Xq'^2$ and $Xq'^2 + 2^9$ and the actual $\sqrt{Xq^2}$ lies between $\sqrt{Xq'^2} = Xq' = 2^9$ and $\sqrt{Xq'^2} = 2^9$. The $\sqrt{Xq'^2 + 2^9}$ is approximately equal to $Xq' + ½\ 2^9 + 2^{-1}$ since $(Xq' + ½)^2 = Xq'^2 + Xq' + ¼$.

Therefore the actual value of $\sqrt{Xq^2}$ is between $2^9$ and $2^9 + 2^{-1}$. The output of the square root table 436 from above, is $Xq' + 2^{-2} = 2^9 + 2^{-2}$ thus meeting the required ± ¼ error allocation.

As the value of $Xq^2$ becomes smaller, the percentage error incurred becomes smaller, for example if the value of $Xq'^2$ is $2^{16}$, the round-off error is only $2^7$ and $$\sqrt{Xq'^2} = 2^8$$

$$Xq'^2 + 2^7 = 2^8 + \tfrac{1}{4}$$

In this case the output of the square root generator 442 will be $Xq' + \tfrac{1}{8}$ after shifting which is within $\tfrac{1}{8}$ of the actual value.

The accuracy holds for all values of $Xq^2$ except those where $Xq'^2$ is less than $2^{-1}$ which could have no input to the square root table 436. Rather than require another shift pulse to examine these bits, a special circuit is provided which forces the output to be equal to $2^{-1}$ when $Xq'^2$ is $2^{-2}$, and forces the output to $2^{-2}$ when $Xq'^2$ is less than $2\ ^{2}$. This is valid since:

If $Xq'^2 = 2^{-2}$, then $X^2q_{max} \simeq 2^1$ and $$X^2q_{min} = 2^{-2}$$

$$\sqrt{2^{-1}} = 0.707$$

and $\sqrt{2^{-2}} = 2^{-1}$ and since the output is forced to be $2^{-1}$, the $\pm \tfrac{1}{4}$ requirement is maintained.

If $Xq'^2 = 0$ then $X^2q_{max} \simeq 2^2$ and $$X^2q_{min} = 0$$

$$\sqrt{2^{-2}} = 2^{-1}$$

$$\sqrt{0} = 0$$

and since the output is forced to $2^{-2}$, the $\pm \tfrac{1}{4}$ requirement is again met.

The above analysis was performed assuming that the square root of $Xq^2$ need be accurate to $\pm \tfrac{1}{4}$ and ignores the error between the actual and theoretical values of $Xq^2$ as analyzed above. This can be justified by an examination of these errors. First, a maximum error in the square root circuit occurs when $Xq^2$ is a large value, which is at the center of the conic ($n = Y_T$). This is also where the maximum error in the iterative process occurs. However, this value is very small compared to the values of $Xq^2$ ($2^{-3}$ as compared to $2^{+18}$) and can be ignored. Also, at this point the error in Xp is only ½ the maximum or $\pm \tfrac{1}{8}$ so the combined error in Xp + Xq is less than ½. The other maximum error in the square root circuit occurs when $Xq^2$ is small, which happens at the top and bottom of ellipses. At the top of the ellipse $n$ is small so the error in Xp and $Xq^2$ is also small. By forcing a cancellation of errors, the error in $Xq^2$ at the bottom of the ellipse is also small (less than $2^{-9}$) and can be ignored.

The only values of $Xq^2$ which have 1 in bit positions $2^{20}$ and $2^{21}$ are the fixed or expanding range circles of a cursor generator. The error in this case will be larger since the round-off is a larger number. Using the same analysis as above, the minimum value of $Xq'^2 = 2^{20}$ and the error $\simeq 2^{11}$ and $$Xq' = 2^{10}$$

$$\sqrt{Xq'^2 + 2^{11}} \simeq 2^{10} + 1$$

After shifting the output of the square root generator 442 will be $$Xq' + \tfrac{1}{2} = 2^{10} + \tfrac{1}{2}$$

thus making the output of the square root circuit $\pm \tfrac{1}{2}$ of the actual value of Xq. Since for circles there is no error in the iterative process in either Xp or $Xq^2$, the entire $\pm \tfrac{1}{2}$ accuracy can be in the square root generator and the overall error maintained at ± 1. Circles do not have errors since ΔXp is zero (no rotation) and $\Delta Xq^2$ and $\Delta^2 Xq^2$ are integers (no rotation and $a^2 = b^2 =$ radius$^2$).

It should be noted that conics with axis greater than $2^{11}$ could be generated with a maximum error of approximately $\pm 1\tfrac{1}{8}$ at the widest points and an error of less than ± 1 for most points.

The timing chart of FIG. 5 shows the possible timing when generating a conic requiring five shifts on each side of the square root generator 442, and can be considered a worst case in terms of conic generator time. The timing chart shows that 42 clock pulses are required:

$$42 \times 23.437 = 984 \text{ nanoseconds}$$

Thus on channels with horizontal line time of 30.989 μsec the maximum number of conics is $$\frac{30.989}{0.984} = 31 \text{ conics (2 intersects per conic)/line}$$

It should be noted that the apparatus can be readily adapted to generate partial circles or ellipses and open conics such as parabolas and hyperbolas.

ALTERNATE EMBODIMENT FOR THE CONIC GENERATOR

Figure 9:
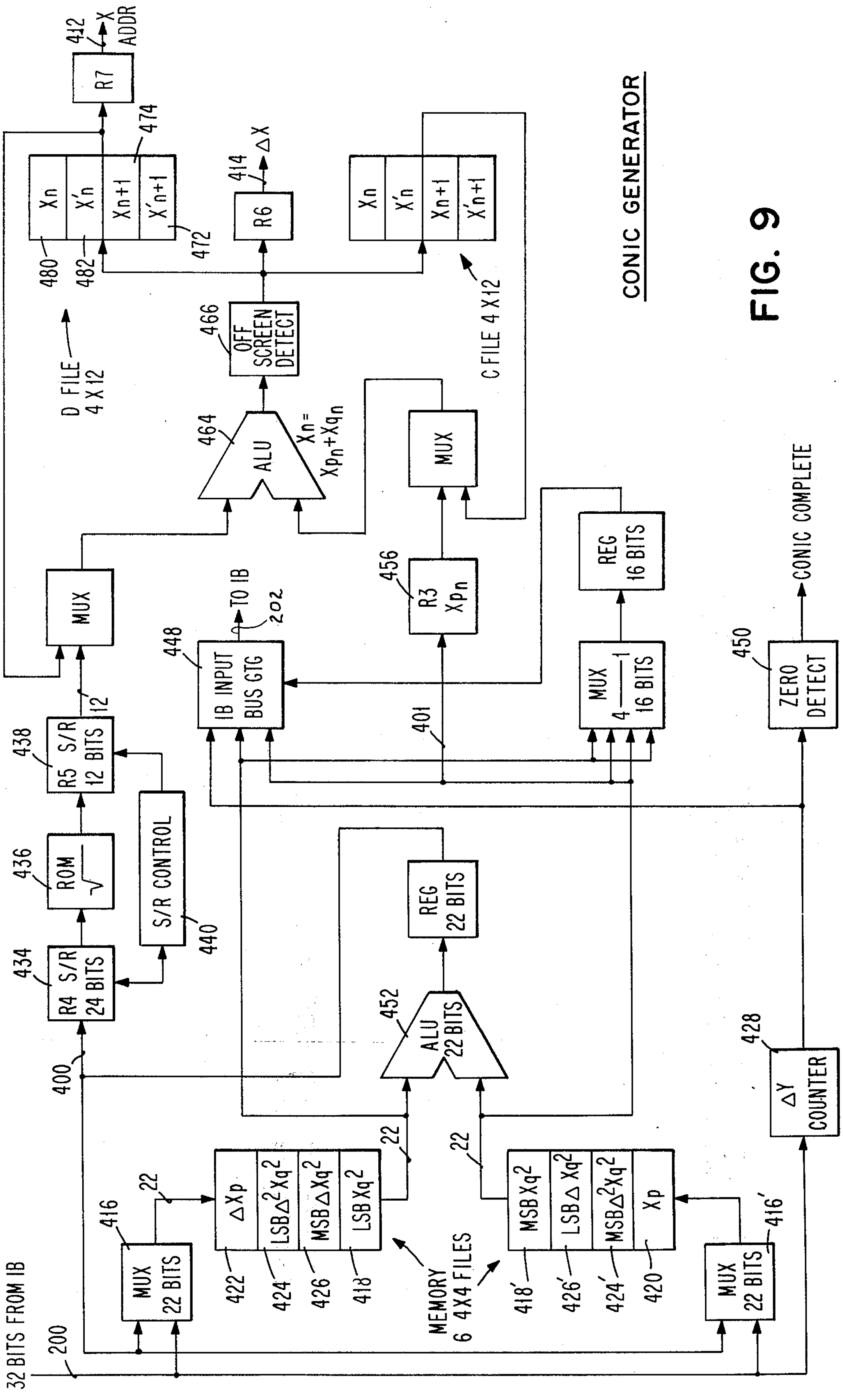
FIG. 9 depicts a block diagram of an alternate embodiment for the conic generator.

An alternate embodiment of the conic generator invention is shown in FIG. 9.

When the first two words are read $X_q^2$ is loaded into the $X_q^2$ register 418 and the 24 most significant bits are transferred into SR1 434. SR1 434 is a 2-bit-at-a-time shift register which shifts the data until either a 1 appears in one of the two most significant bit positions or for a maximum of five shift pulses. The number of shift pulses is stored in the shift control logic 440 and the 11 MSB's of SR1 434 are used as inputs to the square root ROM 436.

For the analysis of this method for obtaining a square root see above. The implementation provides shifting until either the first 1s of $X_q^2$ are in the most significant addresses of the ROM 436 or all of the whole number portion (five 2-bit shifts) of $X_q^2$ is at the addresses of the ROM 436. When the outputs of the ROM 436 have stabilized, the number is loaded into SR2 438. SR2 438 is a 1-bit-at-a-time shift register and the contents are shifted down the same number of times they were shifted up in SR1 434. This method is a way to use floating point to obtain the square root. For example, shifting SR1 434 up five times by 2 bits each is equivalent to multiplying by $2^{+10}$, shifting Sr2 438 down five times by 1 bit each time is equivalent to multiplying by $2^{-5}$ thus after 5 shifts:

$$SR1 = X_q^2 \times 2^{10}$$

and output of ROM $= \sqrt{X_q^2 \times 10^{+10}} = X_q \times 2^5$ after 5 shifts $SR2 = X_q \times 2^5 \times 2^{-5} = X_q$ The remaining data words are read from the Intermediate Buffer and loaded into the register and files as shown in FIG. 9. $X_q^2$, $\Delta X_q^2$ and $\Delta^2 X_q^2$, are all accurate to 42 bits as required per the error analysis above. These are added in two steps through a 22 bit adder 452. The 22 least significant bits are added and the carry saved, then the 20 most significant bits are added with the carry added in. In this manner $X_q{}^2{}_{n+1}$ is generated by adding $X^2_{qn} + \Delta X^2_{qn}$ and $\Delta X^2_{qn+1}$ is generated by adding $\Delta X^2{}_{qn} + \Delta^2 X^2_q$. $X^2_{qn+1}$ is loaded into the R4 418 register and the square root process repeated to find $X_{qn+1}$.

The 11 most significant bits of $X_{pn}$ are transferred to the R3 register 456 and $X_n$ and $X_n'$ are calculated and loaded into the C & D files where $X_n = X_{pn} + X_{qn}$ and $X_n' = X_{pn} - X_{qn}$. Next, $X_{pn+1}$ is calculated and loaded into R3 register. When the value of $X_{qn+1}$ has been determined, $X_{n+1}$ and $X_{n+1}'$ are calculated where $X_{n+1} = X_{pn+1} + X_{qn+1}$ and $X'_{n+1} = X_{pn+1} - X_{qn+1}$. These values are used to calculate the starting X and ΔX of the vector segments making up the conic and are sent to the vector generator to be loaded into the PRAS. An off-screen detect circuit is provided to determine when the line segments are off the screen in which case no write to the vector generator is performed. For conics which begin above the top of the visible raster, values of $X_{p1}$ $X^2_{q1}$ and $\Delta X^2_{q1}$ are calculated by the host processor using the iterative equation.

The value of ΔY is decremented each time an intersect is generated and compared to zero. When zero is detected, the conic is completed thus is not written back into the Intermediate Buffer. To insure closure of the conic, $X_{q\ n+1}$ is set to zero insuring a solid vector at the bottom of the conic. The process is repeated until all conic vector segments for the line group have been generated at which point the data is written back to the Intermediate Buffer.

While the invention has been particularly shown and described with reference to preferred embodiments thereof, it will be understood by those skilled in the art that the foregoing and other changes in form and details may be made therein without departing from the spirit and the scope of the invention.

We claim:

1. A video generator circuit for converting ordered data signals representing ellipses received from a data buffer into a time sequential video signal for use with a sequentially line scanned display device which displays a field composed of raster lines, wherein the improvement comprises:

an input register connected to the output of said data buffer;

decoding means connected to the output of said input register, for decoding said ordered data signals outputted from said data buffer and generating on a first output line components of the ellipse represented which lie along the display line to be scanned;

modifying means having an input connected to the output of said input register, for modifying said decoded ordered data signals to identify the horizontal coordinate for the intersection of said ellipse represented with the next display line to be scanned and outputting said modified data signal over an output line to an input line for storage in said data buffer;

means connected to the output of said input register for inhibiting said outputting of said modified data signal when no components of said ellipse will intersect succeeding display lines to be scanned in said field.

2. The video generator circuit of claim 1, which further comprises:

said raster lines having a vertical separation of ΔY;

said ellipse being characterized by a display axis having an inverse slope $\Delta X_p/\Delta Y$ and which intersects the vertical extrema of the ellipse and an inverse rate of change of the slope of the ellipse $\Delta^2 X_q{}^2/\Delta^2{}_y$;

said data signals including values for the constants $\Delta X_p$ and $\Delta^2 X_q{}^2$ and values for $X_q^2$, $\Delta X_q^2$ and Xp at the extremum of said ellipse, where $X_q$ is the horizontal distance from said display axis to said ellipse.

3. The video generator circuit of claim 2, wherein:

said input register comprises a first register means connected to the output of said data buffer for receiving values of $\Delta X_p$, $\Delta^2 X^2_q$, $X_{pn}$, $X_{qn}{}^2$, and $\Delta X^2{}_{qn}$ corresponding to an Nth one of said display lines;

and said decoding means comprises:

a square root generating means having an input connected to the output of said first register means for calculating the square root of $X_{qn}{}^2$;

a first adder means having an addend input connected to the output of said square root generator and an augend input connected to said first register means for calculating the sum $X_{pn} + X_{qn} = X_n$ and the difference $X_{pn} = X_{qn} = X'_n$ as the location along said Nth display line of the intersection with said ellipse;

a second and a third register means connected to the output of said first adder means for storing the values of $X_n$ and $X'_n$ respectively;

a second adder means having an addend input connected to the output of said square root generator and an augend input connected to said first register means for calculating the sum $X_{pn+1} + X_{qn+1} = X'_{n+1}$, and the difference $X_{pn+1} - X_{qn+1} = X'_{n+1}$ as the location along said N+1st display line of the intersection with said ellipse;

a forth and a fifth register means connected to the output of said second adder means for storing the values of $X_{n-1}$ and $X'_{n+1}$ respectively.

4. The video generator circuit of claim 3 wherein said square root generating means further comprises:

a first shift register having a data input connected to said first register means;

a read only memory having its memory address input connected to the high order n bits of said first shift register, for storing the square root of the number stored in said first shift register, rounded to the n most significant bits;

a second shift register having a data input connected to the data output of said read only memory and an output connected to said first adder means, for receiving the value of the square root of the number stored in said first shift register rounded to the said n most significant bits;

a control means connected to a control input of said first shift register and a control input of said second shift register;

said control means shifting the contents of said first shift register two bits at a time for m times until a one bit occupies one of the two most significant bit positions of said first shift register, prior to accessing said read only memory with said shifted data therein;

said control means shifting the contents of said second shift register one bit at a time for m times so that the accessed data occupies the least significant bit positions thereof;

whereby the square root of $X_q^2$ can be accessed in a minimum time with a minimum rounding error.

5. The video generator circuit of claim 3, wherein said modifying means further comprises:

a third adder means having an augend and addend inputs connected to the output of said first register means and an output as a feedback to the input of said first register means to calculate the values of $X_{q}{}^{2}{}_{n+1} = x_q{}^2{}_n + \Delta X^2{}_{qn}$, $\Delta X^2{}_{qn+1} = \Delta X^2{}_{qn} + \Delta^2 X^2{}_q$ and $X_{pn+1} = X_{pn} + \Delta X_p$ corresponding to the intersection of said ellipse with a line intermediate between the Nth and the N+1st ones of said display lines;

said third adder means outputting the values of $X^2{}_{qn+1}$ and $X_{pn+1}$ to the input of said first register means.

6. The video generator circuit of claim 5, wherein said decoding means further comprises:

said square root generating means calculating the value of $X_{qn+1}$ input from said first register means;

a comparison means connected to said 2nd, 3rd, 4th and 5th register means to determine the larger value of $X_n$ or $X_{n+1}$ and determine the larger value of $X'_n$ or $X'_{n+1}$;

a fourth adder means connected to said 2nd, 3rd, 4th and 5th register means and to said comparison means to calculate the origin the length of raster strokes along said Nth display line representing intersections with said ellipse;

a video signal generating means having an input connected to said fourth adder means and an output connected to said display device for generating a video signal at the locations along said Nth display line corresponding to the intersection with said ellipse.

7. The video generator circuit of claim 2, wherein:

said input register comprises a register means connected to the output of said data buffer for receiving values of $\Delta X_p$, $\Delta^2 X_q^2$, Xp, Xq2 and $\Delta X_q^2$;

and said decoding means comprises square root generating means having an input connected to said register means for calculating the square root of $X_q^2$;

a first adder means having an addend input connected to the output of said square root generator and an augend input connected to said register means for calculating the sum $X_p + X_q$ and the difference $X_p - X_q$ as the location along said display line to be scanned of the intersection with said ellipse;

a video signal generating means having an input connected to said first adder means and an output connected to a partial raster assembly storage, for generating a video signal at the locations along said display line to be scanned corresponding to said values of $X_p + X_q$ and $X_p - X_q$.

8. The video generator circuit of claim 7 wherin said square root generating means further comprises:

a first shift register having a data input connected to said register means;

a read only memory having its memory address input connected to the high order n bits of said first shift register, for storing the square root of the number stored in said first shift register, rounded to the n most significant bits;

a second shift register having a data input connected to the data output of said read only memory and an output connected to said first adder means for receiving the value of the square root of the number stored in said first shift register rounded to the said n most significant bits;

a control means connected to a control input of said first shift register and a control input of said second shift register;

said control means shifting the contents of said first shift register two bits at a time for m times until a one bit occupies one of the two most significant bit positions of said first shift register, prior to accessing said read only memory with said shifted data therein;

said control means shifting the contents of said second shift register one bit at a time for m times so that the assessed data occupies the least significant bit positions thereof;

whereby the square root of $X_q^2$ can be accessed in a minimum time with a minimum rounding error.

9. The video generator circuit of claim 7, wherein said modifying means further comprises:

a second adding means having augend and addend inputs connected to the output of said register means for adding $\Delta X_p$ to $X_p$ to get a new value of $X_p$, $\Delta X_q^2$ to $X_q^2$ to get a new value of $X_q^2$, and $\Delta^2 X_q^2$ to $\Delta X^2_q$ to get a new value of $\Delta X_q^2$ and a sum output connected to the input of said register means;

a data buffer output gate having an input connected to the output of said register means and an output of said modifying means output line connected to the input of said data buffer for rewriting said data word into said data buffer with said new values of $X_p$, $X_q^2$ and $\Delta X_q^2$.

10. The video generator circuit of claim 2, wherein:

said input register comprises a first register means connected to the output of said data buffer for receiving values of $\Delta X_p$, $\Delta^2 X^2{}_q$, $X_{pn}$, $X_{qn}{}^2$, and $\Delta X^2{}_{qn}$ corresponding to the Nth one of said display lines;

and said decoding means comprises:

a square root generating means having an input connected to the output of said first register means for calculating the square root of $X_{qn}{}^2$;

a first adder means having an addend input connected to the output of said square root generator and an augend input connected to said first register means for calculating the sum $X_{pn} + X_{qn} = X_n$ and the difference $X_{pn} - X_{qn} = X'_n$ as the location along said Nth display line of the intersection with said ellipse;

a second and a third register means connected to the output of said first adder means for storing the values of $X_n$ and $X'_n$ respectively.

11. The video generator circuit of claim 10 wherein said square root generating means further comprises:

a first shift register having a data input connected to said first register means;

a read only memory having its memory address input connected to the high order n bits of said first shift register, for storing the square root of the number stored in said first shift register, rounded to the *n* most significant bits;

a second shift register having a data input connected to the data output of said read only memory and an output connected to said first adder means for receiving the value of the square root of the number stored in said first shift register rounded to the said n most significant bits;

a control means connected to a control input of said first shift register and a control input of said second shift register;

said control means shifting the contents of said first shift register two bits at a time for m times until a one bit occupies one of the two most significant bit positions of said first shift register, prior to accessing said read only memory with said shifted data therein;

said control means shifting the contents of said second shift register one bit at a time for m times so that the accessed data occupies the least significant bit positions thereof;

whereby the square root of $X_q^2$ can be accessed in a minimum time with a minimum rounding error.

12. The video generator circuit of claim 10, wherein said modifying means further comprises:

a second adder means having an augend and addend inputs connected to the output of said first register means and an output as a feedback to the input of said first register means to calculate the values of $X_q{}^2{}_{n+1} = X_q{}^2{}_n + \Delta X^2{}_{qn}$, $\Delta X^2{}_{qn+1} = \Delta X^2{}_{qn} + \Delta^2 X^2{}_q$ and $X_{pn+1} = X_{pn} + \Delta X_p$ corresponding to the intersection of said ellipse with a line intermediate between the Nth and the N+1st ones of said display lines;

said second adder means outputting the values of $X^2{}_{qn+1}$ and $X_{pn+1}$ to the input of said first register means;

said square root generating means of said decoding means calculating the value of $X_{qn+1}$ input from said register means;

said first adder means of said decoding means calculating the sum of $X_{pn+1} + X_{qn+1} = X_{n+1}$ and the difference $X_{pn+1} - X_{qn+1} + X'_{n+1}$ as the location along said line midway between said Nth and said N+1st display lines of the intersection with said ellipse.

13. The video generator circuit of claim 12, wherein said decoding means further comprises:

a fourth and a fifth register means connected to the output of said first adder means for storing the values of $X_{n+1}$ and $X'_{n+1}$, respectively;

a comparison means connected to said 2nd, 3rd, 4th and 5th register means to determine the larger value of $X_n$ or $X_{n+1}$ and determine the larger value of $X'_n$ or $X'_{n+1}$;

a third adder means connected to said 2nd, 3rd, 4th and 5th register means and to said comparison means to calculate the origin and length of raster strokes along with Nth display line representing intersections with said ellipse.

14. The video generation circuit of claim 13, which further comprises:

a video signal generating means having an input connected to said third adder means and an output connected to said display device for generating a video signal at the locations along said Nth display line corresponding to the intersection with said ellipse.

15. A video generator circuit for converting randomly occurring data signals representing ellipses received from a host processor into a time sequential video signal for use with a sequentially line scanned display device which displays a field composed of raster lines, wherein the improvement comprises, in combination:

an ordered refresh buffer connected to receive said data and adapted to sort said data signals into groups ordered by extremal scan line position for the ellipse represented;

an intermediate buffer having a first input connected to the output of said ordered refresh buffer for storing said ordered data signals once during each display field before the display of the ellipse represented and outputting said ordered data signals in synchronism with the line scan of the display;

a conic generator means which includes an input register connected to the output of said intermediate buffer and a decoding means connected to the output of said input register for decoding said ordered data signals outputted from said intermediate buffer and generating on an output line components of the ellipse represented which lie along the display line to be scanned;

a partial raster assembly storage connected to said output line from said decoding means of said conic generator means, to store the components of the ellipse represented which lie along the display line to be scanned;

said conic generator means further including a modifying means connected to the output of said input register, for modifying said decoded ordered data signals to identify the horizontal coordinate for the intersection of said ellipse represented with the next display line to be scanned, and outputting said modified data signal to a second input line for storage in said intermediate buffer;

said conic generator means including means connected to the output of said input register to inhibit the output of a modified data signal to said intermediate buffer when no components of said ellipse will intersect succeeding display lines to be scanned in said field.

16. The video generator circuit of claim 9, which further comprises:

said raster lines having a vertical separation of $\Delta y$;

said ellipse being characterized by a display axis having an inverse slope $\Delta X_p/\Delta y$ and which intersects the vertical extrema of the ellipse and an inverse rate of change of the slope of the ellipse $\Delta^2 X_q{}^2/\Delta^2 y$;

said data signals including values for the constants $\Delta Xp$ and $\Delta^2 X_q{}^2$ and values for $X_q{}^2$, $\Delta X_q{}^2$ and Xp at the extremum of said ellipse, where $X_q$ is the horizontal distance from said display axis to said ellipse.

17. The video generator circuit of claim 16, wherein:

said input register comprises a register means connected to the output of said data buffer for receiving values of $\Delta X_p$, $\Delta^2 X_q{}^2$, $X_p$, $X_q{}^2$ and $\Delta X_q{}^2$;

and said decoding means further comprises:

square root generating means having an input connected to said register means for calculating the square root of $X_q{}^2$;

a first adder means having an addend input connected to the output of said square root generator and an augend input connected to said register means for calculating the sum $X_p + X_q$ and the difference $X_p - X_q$ as the location along said display line to be scanned of the intersection with said ellipse;

a video signal generating means having an input connected to said first adder means and an output connected to a partial raster assembly storage, for generating a video signal at the locations along said display line to be scanned corresponding to said values of $X_p + X_q$ and $X_p - X_q$.

18. The video generator circuit of claim 17, wherein said square root generating means further comprises:

a first shift register having a data input connected to said register means;

a read only memory having its memory address input connected to the high order *n* bits of said first shift register, for storing the square root of the number stored in said first shift register, rounded to the n most significant bits;

a second shift register having a data input connected to the data output of said read only memory and an output connected to said first adder means for receiving the value of the square root of the number stored in said first shift register rounded to the said n most significant bits;

a control means connected to a control input of said first shift register and a control input of said second shift register;

said control means shifting the contents of said first shift register two bits at a time for m times until a one bit occupies one of the two most significant bit positions of said first shift register, prior to accessing said read only memory with said shifted data therein;

said control means shifting the contents of said second shift register one bit at a time for m times so that the assessed data occupies the least significant bit positions thereof;

whereby the square root of $X_q^2$ can be accessed in a minimum time with a minimum rounding error.

19. The video generator circuit of claim 17, wherein said modifying means further comprises:

a second adding means having augend and addend inputs connected to the output of said register means for adding $\Delta X_p$ to $X_p$ to get a new value of $X_p$, $\Delta X_q^2$ to $X_q^2$ to get a new value of $X_q^2$, and $\Delta^2 X_q^2$ to $\Delta X^2{}_q$ to get a new value of $\Delta X_q^2$ and a sum output connected to the input of said register means;

a data buffer output gate having an input connected to the output of said register means and an output connected to said second input of said intermediate buffer for rewriting said data word into said intermediate buffer with said new values for $X_p$, $X_q^2$ and $\Delta X_q^2$.

20. The video generator circuit of claim 16, wherein:

said input register comprises a first register means connected to the output of said data buffer for receiving values of $\Delta X_p$, $\Delta^2 X^2{}_q$, $X_{pn}$, $X_{qn}{}^2$, and $\Delta X^2{}_{qn}$ corresponding to an Nth one of said display lines;

and said decoding means comprises:

a square root generating means having an input connected to the output of said first register means for calculating the square root of $X_{qn}{}^2$;

a first adder means having an addend input connected to the output of said square root generator and an augend input connected to said first register means for calculating the sum $X_{pn} + X_{qn} = X_n$ and the difference $X_{pn} - X_{qn} = X'_n$ as the location along said Nth display line of the intersection with said ellipse;

a second and a third register means connected to the output of said first adder means for storing the values of $X_n$ and $X'_n$ respectively.

21. The video generator circuit of claim 20 wherein said square root generating means further comprises:

a first shift register having a data input connected to said first register means;

a read only memory address input connected to the high order n bits of said first shift register, for storing the square root of the number stored in said first shift register, rounded to the n most significant bits;

a second shift register having a data input connected to the data output of said read only memory and an output connected to said first adder means for receiving the value of the square root of the number stored in said first shift register rounded to the said n most significant bits;

a control means connected to a control input of said first shift register and a control input of said second shift register;

said control means shifting the contents of said first shift register two bits at a time for m times until a one bit occupies one of the two most significant bit positions of said first shift register, prior to accessing said read only memory with said shifted data therein;

said control means shifting the contents of said second shift register one bit at a time for m times so that the accessed data occupies the least significant bit positions thereof;

whereby the square root of $X_q^2$ can be accessed in a minimum time with a minimum rounding error.

22. The video generator circuit of claim 20, wherein said modifying means further comprises:

a second adder means having an augend and addend inputs connected to the output of said first register means and an output as a feedback to the input of said first register means to calculate the values of $X_q{}^2{}_{n+1} = X_q{}^2{}_n + \Delta X^2{}_{qn}$, $\Delta X^2{}_{qn+1} = \Delta X^2{}_{qn} + \Delta^2 X^2{}_q$ and $X_{pn+1} = X_{pn} + \Delta X_p$ corresponding to the intersection of said ellipse with a line intermediate between the Nth and the N+1st ones of said display lines;

said second adder means outputting the values of $X^2{}_{qn+1}$ and $X_{pn+1}$ to the input of said first register means;

said square root generating means of said decoding means calculating the value of $X_{qn+1}$ from the value of $X^2{}_{qn+1}$ input from said first register means;

said first adder means of said decoding means calculating the sum of $X_{pn+1} + X_{qn+1}$ and the difference $X_{pn+1} - X_{qn+1} = X'_{n+1}$ as the location along said line midway between said Nth and said N+1st display lines of the intersection with said ellipse.

23. The video generator circuit of claim 22, wherein said decoding means further comprises:

a fourth and a fifth register means connected to the output of said first adder means for storing the values of $X_{n+1}$ and $X'_{n+1}$, respectively;

a comparison means connected to said 2nd, 3rd, 4th and 5th register means to determine the larger value of $X_n$ or $X_{n+1}$ and determine the larger value of $X'_n$ or $X'_{n+1}$;

a third adder means connected to said 2nd, 3rd, 4th and 5th register means and to said comparison means to calculate the origin and length of raster strokes along said Nth display line representing intersections with said ellipse.

24. The video generator circuit of claim 23, which further comprises:

a video signal generating means having an input connected to said third adder means and an output connected to said display device for generating a video signal at the locations along said Nth display line corresponding to the intersection with said ellipse.

25. The video generator circuit of claim 16, wherein:

said input register comprises a first register means connected to the output of said data buffer for receiving values of $\Delta X_p$, $\Delta^2 X^2_q$, $X_{pn}$, $X_{qn}^2$, and $\Delta X^2_{qn}$ corresponding to an Nth one of said display lines;

and said decoding means comprises:

a square root generating means having an input connected to the output of said first register means for calculating the square root of $X_{qn}^2$;

a first adder means having an addend input connected to the output of said square root generator and an augend input connected to said first register means for calculating the sum $X_{pn} + X_{qn} = X_n$ and the difference $X_{pn} - X_{qn} = X'_n$ as the location along said Nth display line of the intersection with said ellipse;

a second and a third register means connected to the output of said first adder means for storing the values of $X_n$ and $X'_n$ respectively;

a second adder means having an addend input connected to the output of said square root generator and an augend input connected to said first register means for calculating the sum $X_{pn+1} + X_{qn+1} = X_{n+1}$ and the difference $X_{pn+1} - X_{qn+1} = X'_{n+1}$ as the location along said N+1st display line of the intersection with said ellipse;

a fourth and a fifth register means connected to the output of said second adder means for storing the values of $X_{n+1}$ and $X'_{n+1}$ respectively.

26. The video generator circuit of claim 25 wherein said square root generating means further comprises:

a first shift register having a data input connected to said first register means;

a read only memory having its memory address input connected to the high order n bits of said first shift register, for storing the square root of the number stored in said first shift register, rounded to the n most significant bits;

a second shift register having a data input connected to the data output of said read only memory and an output connected to said first adder means, for receiving the value of the square root of the number stored in said first shift register rounded to the said n most significant bits;

a control means connected to a control input of said first shift register and a control input of said second shift register;

said control means shifting the contents of said first shift register two bits at a time for m times until a one bit occupies one of the two most significant bit positions of said first shift register, prior to accessing said read only memory with said shifted data therein;

said control means shifting the contents of said second shift register one bit at a time for m times so that the accessed data occupies the least significant bit positions thereof;

whereby the square root of $X_q^2$ can be accessed in a minimum time with a minimum rounding error.

27. The video generator circuit of claim 25, wherein said modifying means further comprises:

a third adder means having an augend and addend inputs connected to the output of said first register means and an output as a feedback to the input of said first register means to calculate the values of $X_{q\,n+1}^2 = X_{q\,n}^2 + \Delta X^2_{qn}$, $\Delta X^2_{qn+1} = \Delta X^2_{qn} + \Delta^2 X^2_q$ and $X_{pn+1} = X_{pn} + \Delta X_p$ corresponding to the intersection of said ellipse with a line intermediate between the Nth and the N+1st ones of said display lines;

said third adder means outputting the values of $X^2_{qn+1}$ and $X_{pn+1}$ to the input of said first register means.

28. The video generator circuit of claim 27, wherein said decoding means further comprises:

said square root generating means calculating the value of $X_{qn+1}$ input from said first register means;

a comparison means connected to said 2nd, 3rd, 4th and 5th register means to determine the larger value of $X_n$ or $X_{n+1}$ and determine the larger value of $X'_n$ or $X'_{n+1}$;

a fourth adder means connected to said 2nd, 3rd, 4th and 5th register means and to said comparison means to calculate the origin and length of raster strokes along said Nth display line representing intersections with said ellipse;

a video signal generating means having an input connected to said fourth adder means and an output connected to said display device for generating a video signal at the locations along said Nth display line corresponding to the intersection with said ellipse.

* * * * *